United States Patent [19]

Mimura

[11] Patent Number: 5,062,673
[45] Date of Patent: Nov. 5, 1991

[54] ARTICULATED HAND

[75] Inventor: Nobuharu Mimura, Aichi, Japan

[73] Assignee: Kabushiki Kaisha Toyota Chuo Kenkyusho, Aichi, Japan

[21] Appl. No.: 458,346

[22] Filed: Dec. 28, 1989

[30] Foreign Application Priority Data

Dec. 28, 1988 [JP] Japan .................. 63-332683

[51] Int. Cl.⁵ .................. B66C 1/10; B25J 15/02
[52] U.S. Cl. .................. 294/111; 294/106; 294/907; 901/34; 901/46; 623/64
[58] Field of Search .................. 294/111, 106, 907; 901/30–34, 36–39, 46, 21; 623/57, 63, 64; 414/5, 6, 7

[56] References Cited

U.S. PATENT DOCUMENTS

| | | | |
|---|---|---|---|
| 4,643,473 | 2/1987 | Douglas | 294/111 |
| 4,740,126 | 4/1988 | Richter | 623/64 X |
| 4,834,761 | 5/1989 | Walters | 294/111 X |
| 4,865,376 | 9/1989 | Leaver et al. | 294/111 |
| 4,921,293 | 5/1990 | Ruoff et al. | 294/111 |
| 4,957,320 | 9/1990 | Ulrich | 294/907 X |

FOREIGN PATENT DOCUMENTS 62-124892  6/1987  Japan .

OTHER PUBLICATIONS

Matthew T. Mason et al., "Robot Hands and the Mechanics of Manipulation", 1985, pp. 150–167.

Primary Examiner—Margaret A. Focarino
Assistant Examiner—Dean J. Kramer
Attorney, Agent, or Firm—Oblon, Spivak, McClelland, Maier & Neustadt

[57] ABSTRACT

An articulated hand comprising a plurality of finger module structures each of which has one top end provided with an abutting member for contacting an object and the other end connected to a finger connecting member and has a plurality of articulates formed between the one and the other ends by combination of a plurality of link members and articulate turn-shafts; a plurality of motors provided at the other ends of the respective finger module structures integrally therewith; a power transmitting device for transmitting motor powers to the articulate turn-shaft and a hand structure connected to a manipulator. The finger modules are arranged in a manner so that the articulate shafts are driven independently of each other, and each of the link members is provided with sensors respectively for directly detecting a relative angle and relative torque between adjacent link members. Each of the articulate turn-shafts is provided with an angel-torque servo system, wherein deviation signals based on the relative angle and torque are processed. In the articulated hand, each of the motors is connected to a variable constant-current source to change its power through changing an instruction current value and values of motor revolution speed obtained from driving voltages of the motors are respectively fed back to the servo systems to thereby correct the instruction current values.

9 Claims, 8 Drawing Sheets

ARTICULATED HAND

BACKGROUND OF THE INVENTION

The present invention relates to a human-modeled hand mechanism which can be used as a substituting mechanism for performing various kinds of work manually carried out by human workers, and, more particularly, it relates to a human-modeled articulated hand for use as an endeffector for robots, artificial arms and various manipulators.

Heretofore, endeffectors (hands) for use in industrial robots have been put into practice as one of the apparatus of the type as described above. In most cases, the endeffectors have a structure in which two flat plates are arranged opposite each other and operated through link mechanisms, straight-driving guide mechanisms, and the like. In the case where the kind of objects to be grasped is decided beforehand, endeffectors of the kind having the form suitable to the kind of the objects are used. In the case where various kinds of objects are dealt with, on the other hand, interchangeable endeffectors are used.

However, the former is short of generalization, flexibility and adaptability to be required of robots, and the latter has limitations, such as a structural limitation in which the endeffectors must be interchangeable, a limitation in which endeffectors for replacement must be prepared in the vicinity of the respective robot, and the like.

On the other hand, five-finger hands, three-finger hands and the like are under investigation and development. The field to which the hands of this type are mainly applied is a field of artificial hands. That is to say, an object of the hand of this type is to imitate a human hand. The five-finger hand is designed to imitate a human hand in such a manner that a first finger or thumb is opened and closed by a hydraulic actuator while other fingers constituted by link mechanisms are bent and stretched in pairs at once through a pulse motor. However, such a five-finger hand has the following structural disadvantages: 1) the articulates of the hand cannot be driven independently because the articulates of the fingers are linked; 2) a hydraulic pump must be provided separately because a hydraulic actuator is used for opening and shutting the thumb; 3) the grasping force of the hand is little because optimum torque cannot be given to every shaft because the driving source is constructed by one pulse motor; and the like.

Therefore, three-finger hands improved to move articulates independently of each other have been proposed. The hand of this type has a structure in which pulleys of respective articulates are driven independently of each other by wire ropes passed into sleeves. However, such a hand has the following disadvantages: 1) the load imposed on each wire rope acting as a power transmittng means is so large that accuracy in positioning as well as in force control is lowered by the expansion of the wire rope, because the torque and angle of each articulate cannot be detected; 2) the loss of power of the wire rope is so large that the grasping force of the hand cannot be increased, because the hand is far from the driving source and a wire rope provided with a sleeve is used as the power transmittng means (the more the diameter of the wire rope increases, the more the loss of power increases); 3) because the sleeve cannot be bent in large curvature, the wire rope-sleeve mechanism can hardly be set in a robot or interferes with work; 4) because the wire rope is used in combination with sleeve, the friction therebetween is large when the sleeve is bent in large curvature; and the like. In an alternatively proposed multi-finger hand, fingers are connected with each other coaxially in multi-stages through link mechanisms each having a ball screw as its one side; and a worm gear, a wire and the ball screw are connected in order to form a power transmitting system (Japanese Unexamined Patent Publication No. 62-124892). This structure, however, has the following disadvantages: 1) because the power transmitting system is so complex in construction that the loss of power is large, speed-reduction mechanisms in the power transmitting means, such as a worm gear and a ball screw, are inferior in reversibility of power transmission, so that the mechanisms can hardly be operated from the side of the hand though they can be operated from the side of the motor; 2) because the finger cannot be elastically bent though external force acts on the top of the finger, the hand cannot be applied to the case where the subject is fragile; 3) because the relationship between the first and second fingers is fixed, objects to be grasped are limited; and the like.

SUMMARY OF THE INVENTION

It is therefore an object of the present invention to solve the aforementioned problems in the prior art.

It is another object of the present invention to provide an articulated hand of a manipulator which can stably grasp a subject regardless of the form and material of the subject without making the construction complicated and can change the posture or position of the grasped subject to thereby improve in compliance and adaptability to circumstances.

The inventor has investigated the structure of the hand capable of stably grasping the subject regardless of the form of the subject and capable of changing the attitude or position of the grasped subject. As a result, it has been found that the hand must be in contact with the subject at three or more points for the purpose of grasping the subject stably, and, accordingly, a hand structure having three or more fingers is required. Further, to change the posture or position of the grasped subject, it is necessary to control three-dimensionally the position of the respective contacting point between the finger and the subject and also control three-dimensionally the magnification and direction of the finger force acting on the respective contacting points. Accordingly, a finger structure having three or more degrees of freedom (articulates) is required. In short, the hand having the aforementioned function requires at least three fingers and at least nine articulates. Heretofore, such hands have been investigated as five-finger hands or three-finger hands. However, such conventional hands have various disadvantages as described above.

Therefore, the inventors have considered the whole of a hand to be a set of fingers independent of each other and have paid attention to an idea that a hand is formed by combination of finger modules.

With respect to the finger module, a structure having three degrees of freedom (D.O.F.) has been examined. Constituent members of a finger, such as link members, power transmitting means, motors, sensors, and the like, are united into one finger module, so that one finger module is designed to have necessary functions of one finger to simplify the construction, assembling and maintenance of the hand. Further, because the sensors are respectively arranged to detect relative angles or torque between adjacent link members directly, angle-torque interference caused by the power transmittng means can be eliminated by a relatively simple control system and, at the same time, the power transmittng means can be simplified in construction. To stabilize a servo system, motor revolution speed must be detected from the motor shaft so as to be fed back. In general, speed detectors such as tachometer generators are respectively installed in motors to thereby detect the revolution speed. However, speed detectors such as tachometer generators have a disadvantage in that they are large in size and heavy in weight. Therefore, the present invention employs a method of detecting counter-electromotive force from the voltage of each motor to thereby estimate the revolution speed of the motor, so that each of the finger modules can be reduced in size and weight.

Although the revolution speed of the motor cannot be detected accurately by this method, the arithmetic operation used in this method to estimate the revolution speed is relatively simple. Accordingly, this method has an advantage in that a heavy load is not imposed on the controller. Because the revolution speed is made for the purpose of stabilizing the control system, increasing the rate of feedback is more important than increasing accuracy of speed detection. Accordingly, the method of the present invention is suitable for this purpose, because the arithmetic operation used in the method is small in quantity of operation.

Because the finger modules can be relatively freely connected to each other by the finger connecting member, the present invention can be utilized though the size of the subject may be changed greatly. Further, the present invention has an advantage in that the number of finger modules can be increased to four or five and, on the contrary, the number of finger modules can be decreased to two or one so as to use the hand as a micro-manipulator.

The articulated hand according to the present invention comprises: a plurality of finger structures each of which has one top end provided with an abutting member for contacting a subject and the other end connected to a finger connecting member and has a plurality of articulates formed between the one and the other ends by combination of a plurality of link members and turn-shafts so that the articles are capable of being bent and stretched both in a first direction vertical to the longitudinal direction of the finger structure and in a second direction perpendicular to the first direction; a plurality of motors provided at the other ends of the respective finger structures respectively in a manner so as to give torque to the link members through a power transmitting means to thereby freely bend and stretch the link members independently of each other; and a hand structure connected to a manipulator so as to arrange at least one of the finger structures to be in opposition to the other ones of the finger structures and so as to change the distance between the finger structures in opposition to each other through the operation of the motors to bring the finger structures into contact with the subject; the finger modules being arranged in a manner so that each of the power, transmitting means for moving respective shafts of the articulates is composed of a reduction gear, a pair of pulleys, and a wire, whereby the articulate shafts are driven independently of each other; each of the link members is provided with sensors respectively for directly detecting a relative angle between adjacent link members and for directly detecting relative torque between adjacent link members; each of the motors is connected to a variable constant-current source to change its power through changing an instruction current value; angle-torque servo systems are provided respectively for the articulate shafts independently of each other to move the articulate shafts based on the interlink angle and torque detected by the angle and torque sensors; and values of motor revolution speed obtained from driving voltages of the motors are respectively fed back to the servo systems to thereby correct the instruction current values.

The thus configured articulated hand according to the present invention constructed as described above has an advantage in that mechanical interference caused by the power transmitting means when the finger structures are bent or stretched can be eliminated to thereby simplify the power transmitting mechanism in construction and reduce the same in size and weight, and at the same time, stable relative motion between the fingers. Further, because each of the finger structures is configured as a module including an electric motor, the relationship between the finger structures constituting a hand structure can be changed by adjusting or changing the connecting member in accordance with the subject. Furthermore, the hand of the present invention has an advantage in that the number of finger structures can be increased to four or five, or, on the contrary, the number of finger structures can be decreased to two or one for using the hand as a micro-manipulator.

According to the other features of the present invention, link members, motors, and angle and torque sensors as constituent components of a finger structure are collected into one module, that is to say, angle and torque sensors are provided in the vicinity of the respective articulate shafts to thereby make it possible to eliminate easily mechanical interference caused by the motive transmitting means and, at the same time, motors are arranged on the center axis of the respective fingers to thereby make it possible to attain a module reduced in size and weight.

Because one module has three rotation shafts (three degrees of freedom), the position of the finger top and the force produced in the finger top can be designed three-dimensionally freely. Accordingly, when three or more modules constructed as described above are combined, not only objects having various forms can be grasped stably but also the posture or position of the grasped objects can be changed freely.

Because one finger is provided as a module, compliance or adaptability to circumstances can be improved greatly compared with the prior art in the point of view that the number of modules and the combination thereof can be changed to be optimized in accordance with the objects. In particular, when something is wrong, only a module being out of order can be interchanged. Accordingly, there arises a large practical effect in that not only mending can be made easy but also the time required for mending can be shortened greatly.

According to a further feature of the present invention, the finger tip as an abutting member provided in the top of the finger module is composed of a rod-like core member having a screw portion at its one end, a base member substantially conically shaped in its external appearance and formed of softer material than that of the rod-like core member, such as hard rubber or the like, another base member shaped like a human finger top in its external appearance and formed of softer material than that of the base member, and an elastic skin member shaped like a human finger top in its external appearance and subjected to a surface treatment for patterning its outer surface with fine bosses or wrinkles to increase the coefficient of friction, the rod-like core member being inserted in the center of the base member, the skin member being fixed to the outside of the base member so as not to be peeled off, the skin member being put on the outside of the base member. Accordingly, when the subject is grasped, the form of the finger tip is changed in accordance with the form of the subject to make it possible to grasp the subject securely. The other effects of the present invention are as follows.

(1) Because the finger modules can be relatively freely connected to each other by the finger connecting member, the present invention can be utilized even if the size of the subject may be changed greatly. Further, the present invention has an advantage in that the number of finger modules can be increased to four or five, or, on the contrary, the number of finger modules can be decreased to two or one for using the hand as a micro-manipulator.

(2) Because the sensors are respectively arranged to detect interlink angles or torque directly, angle-torque interference caused by the power transmitting means can be eliminated by a relatively simple control system and, at the same time, the power transmitting means can be simplified in configuration. To stabilize a servo system, motor revolution speed must be detected from the motor shaft so as to perform feedback control. In general, speed detectors such as tachometer generators are respectively installed in motors to thereby detect revolution speed. However, speed detectors such as tachometer generators have a disadvantage in that they are large and heavy. Therefore, the present invention employs a method of detecting electromotive force from the voltage of each motor to thereby detect the revolution speed of the motor, so that each finger module can be reduced in size and weight.

Although the revolution speed of the motor cannot be detected accurately by this method, the arithmetic operation used in this method to estimate the revolution speed is relatively simple.

Accordingly, this method has an advantage in that a heavy load is not imposed on the controller. Because the feedback of speed is made for the purpose of stabilizing the control system, increasing the rate of feedback is more important than increasing accuracy of speed detection. Accordingly, the method of the present invention is suitable for this purpose, because the arithmetic operation used in the method is small in quantity of operation.

(3) Because the base member made of a relatively soft material is fixed to the outside of the other base member made of a relatively hard material and is designed to have an appearance like a human finger, the form of the base member can be changed in accordance with the external form of the subject to be grasped. Further, because the base member is shaped conically, the finger top is not excessively deformed regardless of the position where the subject is grasped. Accordingly, the present invention has an advantage in that the subject can be grasped securely.

DESCRIPTION OF THE PREFERRED EMBODIMENTS

The present invention, as to preferred embodiments thereof, will be described hereunder.

FIRST EMBODIMENT

Figure 1:
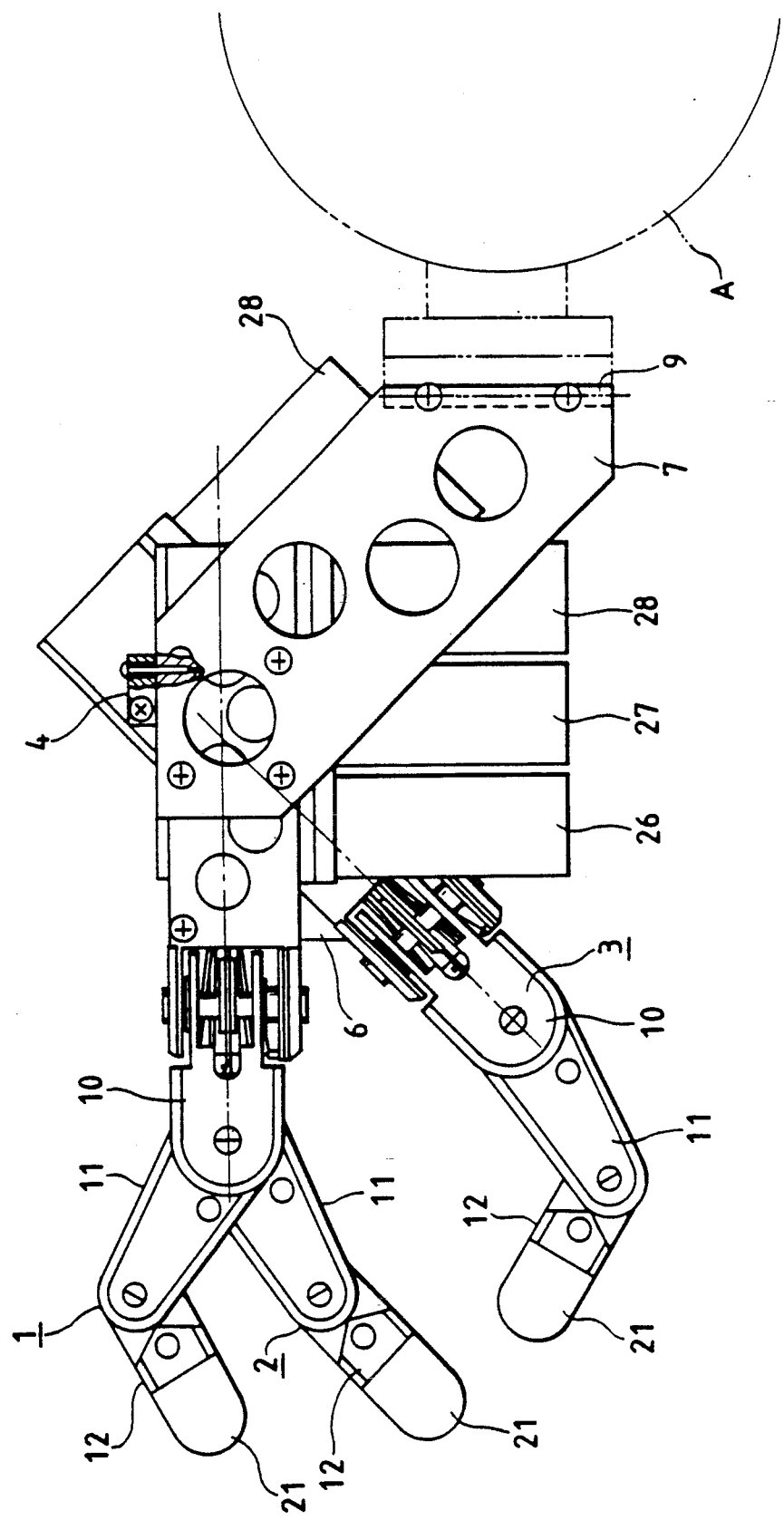
FIGS. 1 and 2 are side and plan views of a first embodiment of the articulated hand according to the present invention.
Figure 2:
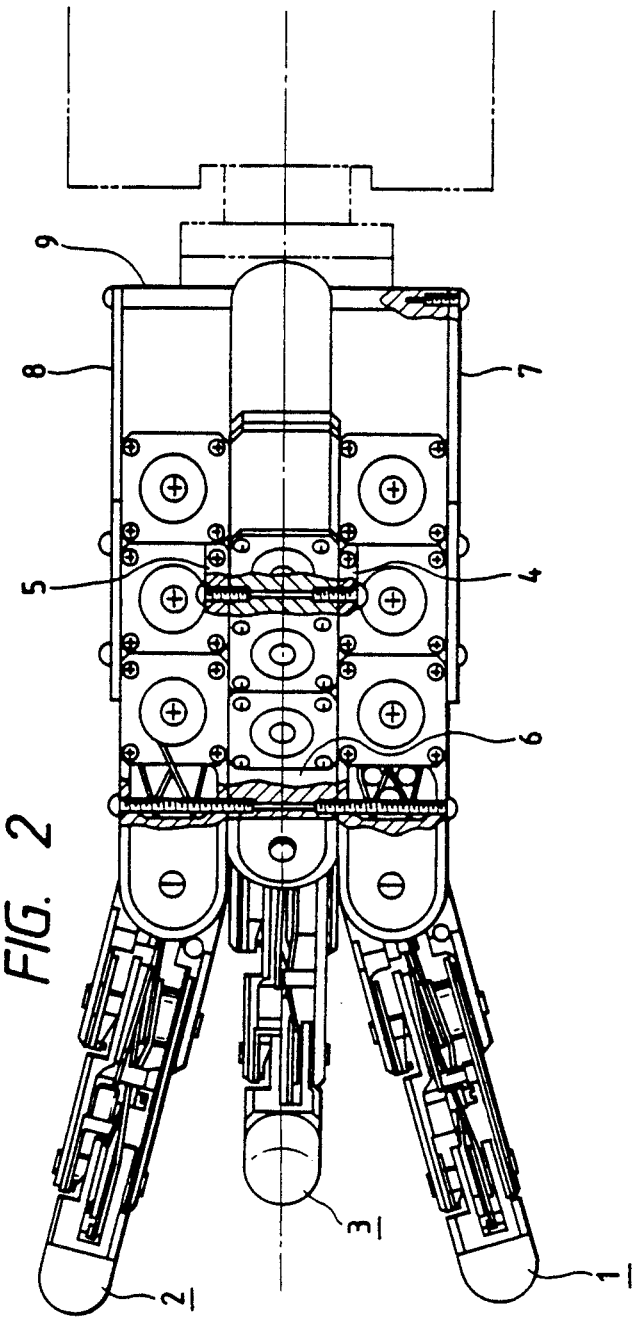

FIGS. 1 and 2 are views showing a first embodiment of the present invention in which an articulated hand is set up in the top of an arm A in an industrial robot. In the drawings, the reference numerals 1, 2 and 3 designate first, second and third finger modules. The first and second modules 1 and 2 are arranged so as to have center axes parallel to each other while disposing the third module 3 therebetween. The third module 3 is arranged so as to have a center axis at an angle of about 20 to about 60 degrees from the respective center axes of the finger modules 1 and 2, so that the finger tops of the finger modules 1 and 2 are arranged opposite to the finger top of the finger module 3. In short, the finger modules are equipped to grasp a certain subject easily. The first and second finger modules 1 and 2 are freely detachably attached to the third finger module 3 in one body by finger connecting members 4, 5 and 6 to thereby make up a finger construction or hand construction. The form and size of the finger connecting members 4, 5 and 6 can be changed in accordance with the form and size of the subject to be grasped by the hand construction. In short, the finger construction is equipped to deal with various kinds of objects.

The finger construction having the three finger modules 1, 2 and 3 is detachably attached to hand connecting members 7, 8 and 9 which are detachably attached to the top of an arm of an industrial robot.

Figure 3:
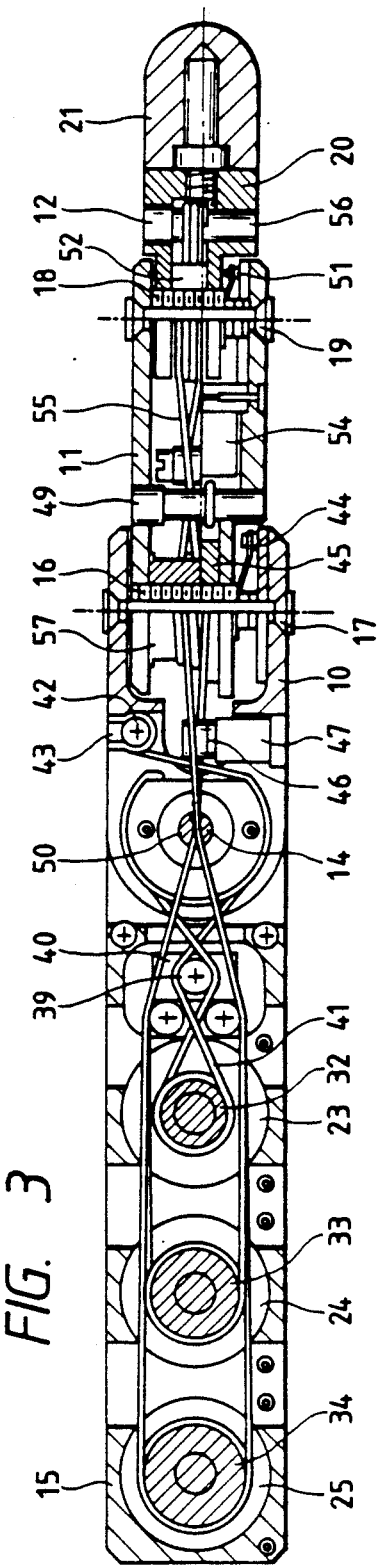
FIGS. 3 and 4 are longitudinal and transverse sectional views of a finger mechanism in the hand.
Figure 4:
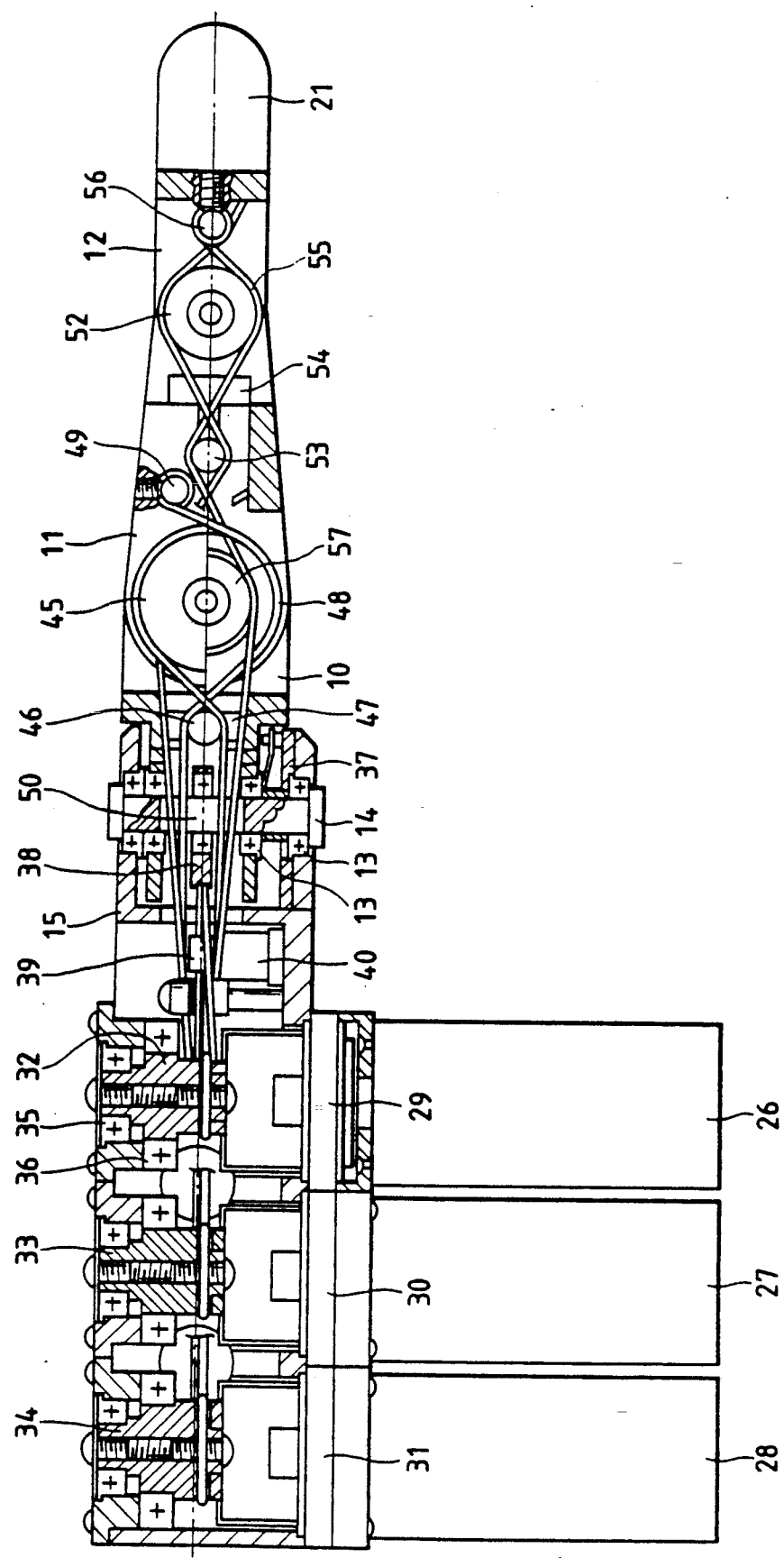

FIGS. 3 and 4 are views showing the detailed construction of a typical one of the finger modules 1, 2 and 3 forming the articulated hand of the first embodiment.

In the drawings, the reference numerals 10, 11 and 12 designate first, second and third links which are respectively equivalent to human finger joints and are provided with joints at the opposite ends of the first and second links 10 and 11 and at the one end of the third link 12 to thereby rotatably connect the links. The first link 10 has one end connected substantially on the center axis of one end of a base member 15 through a bearing 13 so as to be rotatable on a first shaft 14 and so as to be turnable perpendicularly to the plane of the paper of FIG. 4. The other end of the first link 10 is connected to one end of the next, second link 11 through a bearing 16 so as to be rotatable on a second shaft 17 arranged perpendicularly to the first shaft 14. The other end of the second link 11 is connected to one end of the third link 12 through a bearing 18 so as to be rotatable on a third shaft 19 arranged in parallel to the second shaft 17. Accordingly, the second and third links are connected so as to be turnable perpendicularly to the plane of the paper of FIG. 3. At the other end of the third link 12, a screw hole 20 is provided substantially on the center axis thereof. A finger tip 21 for grasping a subject is screwed in the screw hole 20. The finger tip 21 is constructed so as to be interchangeable in accordance with the form, hardness and surface condition of the subject.

Three substantially cylindrical holes 23, 24 and 25 are provided on the center axis of a plane 22 which is adjacent to the plane of the base member 15 where the first shaft 14 is equipped and which is perpendicular to the first shaft 14. First, second and third motors 26, 27 and 28 for driving the links 10, 11 and 12 are respectively fixed on the center axes of the holes so as to be parallel to the first shaft 14. First, second and third reduction gears 29, 30 and 31 and driving pulleys 32, 33 and 34 respectively coaxially with the shafts of the motors 26, 27 and 28 are fixed to the base member 15 through bearings 35 and 36, so that the three combinations of the motors 26, 27 and 28 and the reduction gears 29, 30 and 31 are collected compactly in the inside of the base member 15.

A sensor with mechanical contact 37 (which may be replaced by a sensor without mechanical contact) for detecting the relative rotation angle between the base member 15 and the first link 10 is set up therebetween and coaxially with the first shaft 14. A joint pulley 38 fixed to the first link 10 is set up substantially on the center axis of the first link 10. An idle pulley 39 is rotatably mounted, through a bearing, onto a beam-shaped steel member 40 at substantially the center between the pulley 38 and the first driving pulley 32 and on the center axis of the base member 15. The beam-shaped steel member 40 is fixed to the base member 15. A wire rope 41 as a power transmitting means is laid over the first driving pulley 32 and the joint pulley 38. The wire rope 41 is fixed at its substantially middle portion to the driving pulley 32. One and the other ends of the wire rope 41 are fixed to the joint pulley 38 and an anchor-pin 42 respectively.

On the other hand, the anchor-pin 42 having at its one end a groove for performing screwing is freely rotatably inserted into the first link 10 and fixed by a set-screw 43. The looseness of the wire rope 41 can be eliminated by winding one end of the wire rope around the anchor-pin 42.

The wire rope 41 is doubly crossed between the driving pulley 32 and the joint pulley 38 to put the idle pulley 39 therebetween from opposite sides of the pulley 39, so that force corresponding to the difference between tensions acting on the two portions of the wire rope 41 laid over the idle pulley 39 or in other words force corresponding to the torque acting on the first link 10 acts on the idle pulley 39. A strain gage (not shown) is stuck onto the opposite sides of the beam-shaped steel member 40 pivotally supporting the idle pulley 39, so that the force acting on the idle pulley 39, that is, the joint torque, can be detected.

A sensor with mechanical contact 37 (which may be replaced by a sensor without mechanical contact) for detecting the relative rotation angle between the first and second links 10 and 11 is set up coaxially with the second shaft 17 and between the first and second links 10 and 11. A second joint pulley 45 fixed to the second link 11 is mounted substantially on the center axis of the first link 10. An idle pulley 46 is provided at substantially the center between the pulley 45 and the first joint pulley 38 and on the center axis of the first link 10 and is rotatably mounted on a beam-shaped steel member 47 through a bearing. The beam-shaped steel member 47 is fixed to the first link 10 in the same manner as the beam-shaped steel member 40, having a strain gage (not shown) stuck thereon to detect the torque acting on the second link. A wire rope 48 as a power transmitting means is laid over the second driving pulley 33 and the joint pulley 45. The wire rope 48 is fixed at its substantially middle portion to the driving pulley 33, having one and the other ends fixed to the second link 11 and an anchor-pin 49 respectively. With respect to the first shaft 14, the wire rope 48 is passed through a groove portion 50 provided in the middle portion of the first shaft 14 and having a substantially hand-drum-like shape in section to thereby minimize the influence of the rotation of the first shaft 14 on the expansion of the wire rope 48 and minimize the influence of the second shaft 17 distorted by 90 degrees relative to the shaft of the driving pulley 33.

Detailed description of the second joint portion as to substantially the same parts as the sleeve of the first joint portion will be omitted.

A sensor with mechanical contact 51 (which may be replaced by a sensor without mechanical contact) for detecting the relative rotation angle between the second and third links 11 and 12 is set up therebetween and coaxially with the third shaft 19. A third joint pulley 52 fixed to the second link 11 is mounted substantially on the center axis of the second link 11. An idle pulley 53 is provided at substantially the center between the pulley 52 and the second joint pulley 45 and on the center axis of the second link and is rotatably mounted onto a beam-shaped steel member 54 through a bearing. The beam-shaped steel member 54 is fixed to the second link 11 in the same manner as each of the beam-shaped steel members 40 and 47, having a strain gage (not shown) stuck thereon to detect the torque acting on the third link 12. A wire rope 55 as a power transmitting means is laid over the third driving pulley 34 and the third joint pulley 52. The wire rope 55 is fixed at its substantially middle portion to the third driving pulley 34, having one and the other ends fixed to the third link 12 and to an anchor-pin 56, respectively. In respect to the first shaft 14, the wire rope 55 is passed through the groove portion 50 having a substantially hand-drum-like shape in section and provided in the middle portion of the first shaft 14 to thereby minimize the influence of the rotation of the first shaft 14 on the expansion of the wire rope 55 and minimize the influence of the third shaft 19 distorted by 90 degrees relative to the shaft of the third driving pulley 34. In respect to the second shaft 17, the wire rope 55 is wound by one turn on an idle pulley 57 provided coaxially with the second shaft 17 to thereby eliminate the influence of the rotation of the second shaft 17.

Detailed description of the third joint portion as to the substantially same parts as the sleeve of the first joint portion will be omitted.

As described above the finger modules 1, 2 and 3 in the first embodiment are improved in the method of arranging the power transmitting means (the method of setting the wire ropes 41, 48 and 55) and the method of sensing both the angle and torque, so that it is made possible to collect compactly the motors 26, 27 and 28 and the reduction gears 29, 30 and 31 generally requiring large space and, at the same time, it is made possible to unite them with finger constructions as end effectors into one body as a module construction to be easy to handle.

Because one module has three shafts 14, 17 and 19 (three degrees of freedom), the position of the finger top and the force produced in the finger top can be designated three-dimensionally freely. Accordingly, when three or more modules constructed as described above are combined, not only objects having various forms can be grasped stably but also the posture or position of the objects grasped can be changed freely.

Further, because one finger is constructed as a module, compliance or adaptability to circumstances can be improved greatly compared with the prior art in that the number of modules and the combination thereof can be changed to be optimized corresponding to the objects. In particular, when something is wrong, only a module being out of order can be interchanged. Accordingly, there arises a large practical effect in that not only mending can be made easy but also the time required for mending can be shortened greatly.

Figure 5:
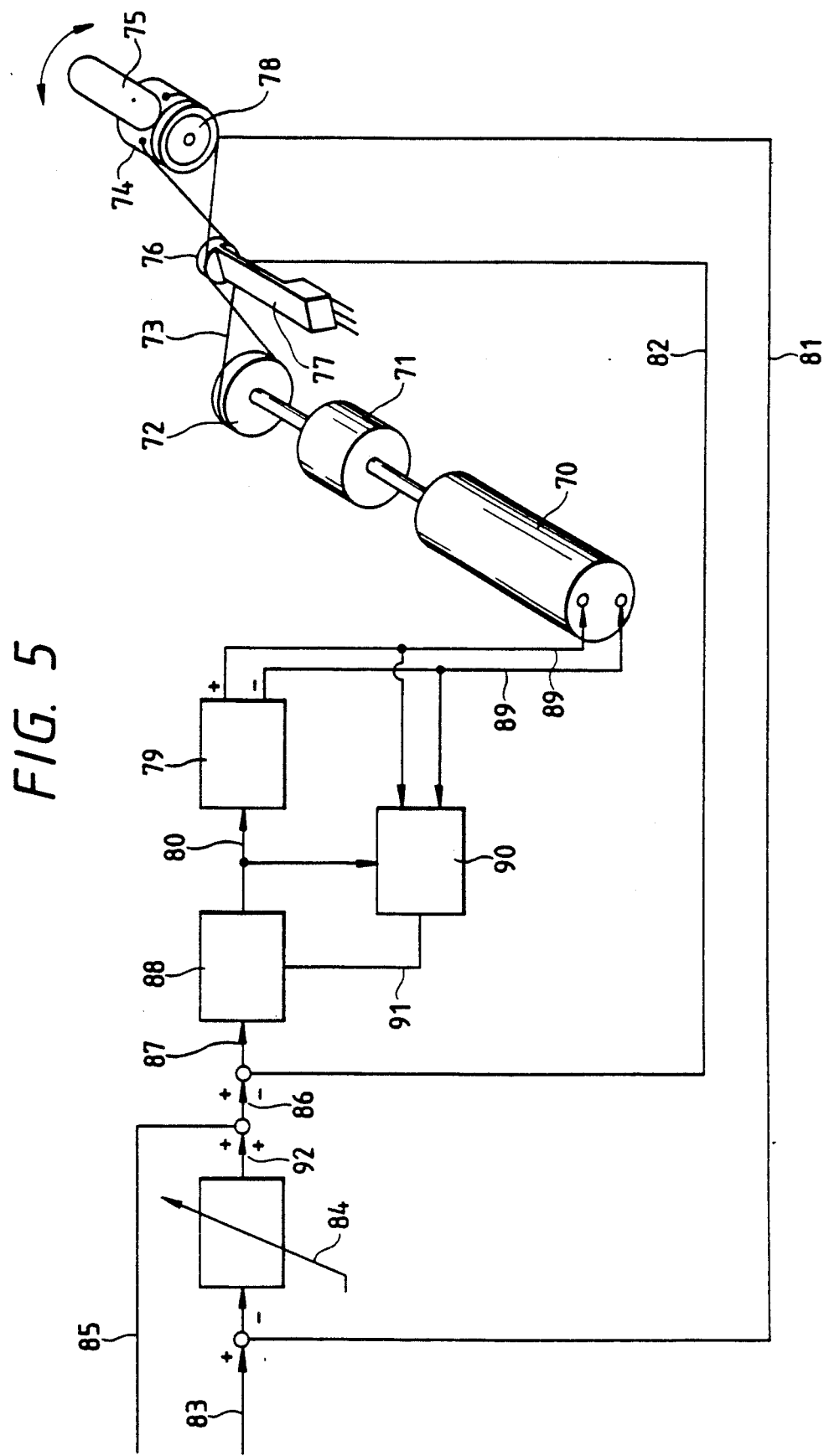
FIG. 5 is a block diagram of an angle and torque control system for each articulate in the finger mechanism.

FIG. 5 is a view showing a control system for controlling the angle and torque in each of articulate axes in the articulated hand of the first embodiment. Although the hand in this embodiment has nine articulate axes, a control system for controlling one of the articulate axes is typically shown in FIG. 5 because each of the articulate axis can be controlled by a similar control system.

The link driving system in the articulated hand of the first embodiment is constructed so that the power of a driving pulley 72 mounted coaxially with a motor 70 through a reduction gear 71 is transmitted, by a wire rope 73 as a power transmitting means, to a joint pulley 74 fixed to a link 75. Detection of torque and angle is made as follows. The driving torque of the link 75 can be directly detected by an idle pulley 76 and a beam-shaped steel member 77 provided at substantially the center between the driving pulley 72 and the joint pulley 74 as described above. The rotation angle of the link 75 can be directly detected by an angle sensor 78. The motor 70 is connected to a variable constant-current source 79 so that its driving force can be changed by changing an instruction current value 80. A torque instruction 86 is produced by adding a target torque value 85 to imaginary torque 92 which is obtained by multiplying by an imaginary stiffness constant 84 by a deviation between the interlink angle 81 directly detected by the angle sensor 78 and a target angle value 83. Further, a modified torque instruction 87 is produced by calculating a deviation between the torque instruction 86 and the joint torque 82 detected by the torque sensor 76, 77 and is fed to a compensator 88. In the compensator 88, a current instruction value 80 is produced based on the modified torque instruction 87 and an estimated motor revolution speed 91 and is applied to the variable constant-current source 79 to thereby control a motor voltage 89. The estimated motor revolution speed 91 applied to the compensator 88 is a value estimated based on the measured motor voltage 89 and the current instruction value 80 by a speed observer 90.

When the rotor inductance of the motor is so small as to be neglected, the following formula is established.

$$Nm = (Vg - Im \cdot Rm)/Kv \tag{1}$$

In the formula,
Nm: estimated motor revolution speed
Vg: measured motor voltage
Im: variable constant-current source output current
Rm: rotor resistance of the motor
Kv: counter-electromotive force constant of the motor When the current instruction value 80 given to the variable constant-current source 79 is replaced by Imt, the output current Im of the source 79 having constant-current characteristic is controlled to be constant as shown in the following formula (2) though the load and revolution speed on the motor 70 may be changed.

$$Im = Imt \tag{2}$$

Accordingly, the following formula (3) is obtained from the formulae (1) and (2).

$$Nm = (Vg - Imt \cdot Rm)/Kv \tag{3}$$

Because the rotor resistance Rm and the counter-electromotive force constant Kv are known values peculiar to the motor, the motor revolution speed Nm can be calculated if the current instruction value Imt given to the variable constant-current source 79 and the motor voltage Vg can be known. The speed observer 90 is constructed to estimate the motor revolution speed according to the formula (3).

In short, this embodiment has a feature that mechanical angle-torque interference caused by the power transmitting means when the fingers are bent or stretched can be eliminated by constructing the aforementioned angle-torque control system in each link driving system to thereby simplify the power transmitting mechanism in structure and reduce the same in size and weight, and, at the same time, the motor revolution speed estimated by the aforementioned method can be fed back to the compensator so that damping may be applied to said angle-torque servo systems to eliminate vibration therein, to thereby attain stable motion of the fingers. Further, not any specific sensor such as a tachometer generator used in the prior art is required for detecting the motor revolution speed. Accordingly, not only the size and weight can be improved, but also unnecessary wirings can be reduced. Consequently, there arises a large practical effect in that reliability can be improved.

SECOND EMBODIMENT

Figure 6:
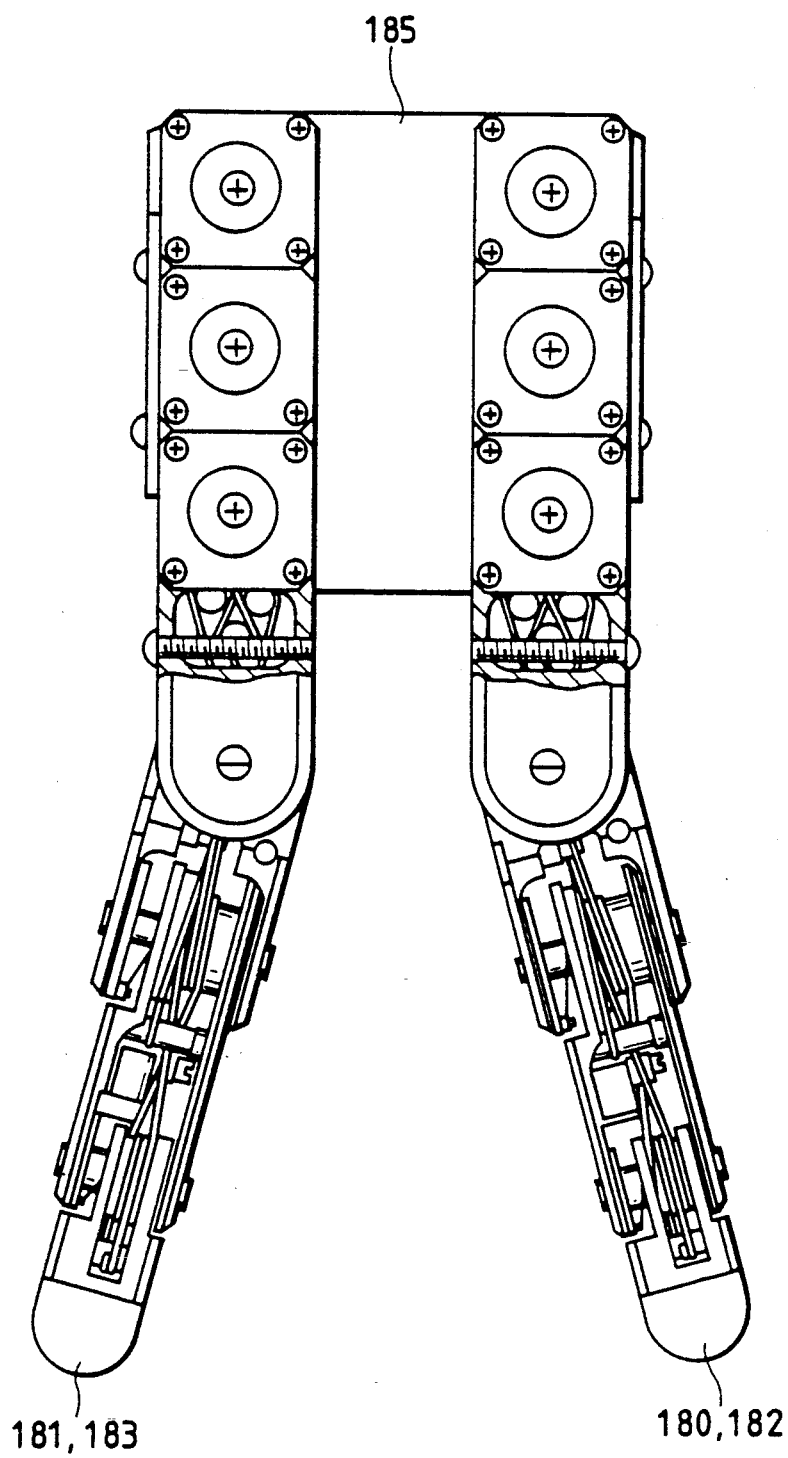
FIGS. 6 and 7 are plan and side views of a second embodiment of the articulated hand according to the present invention.
Figure 7:
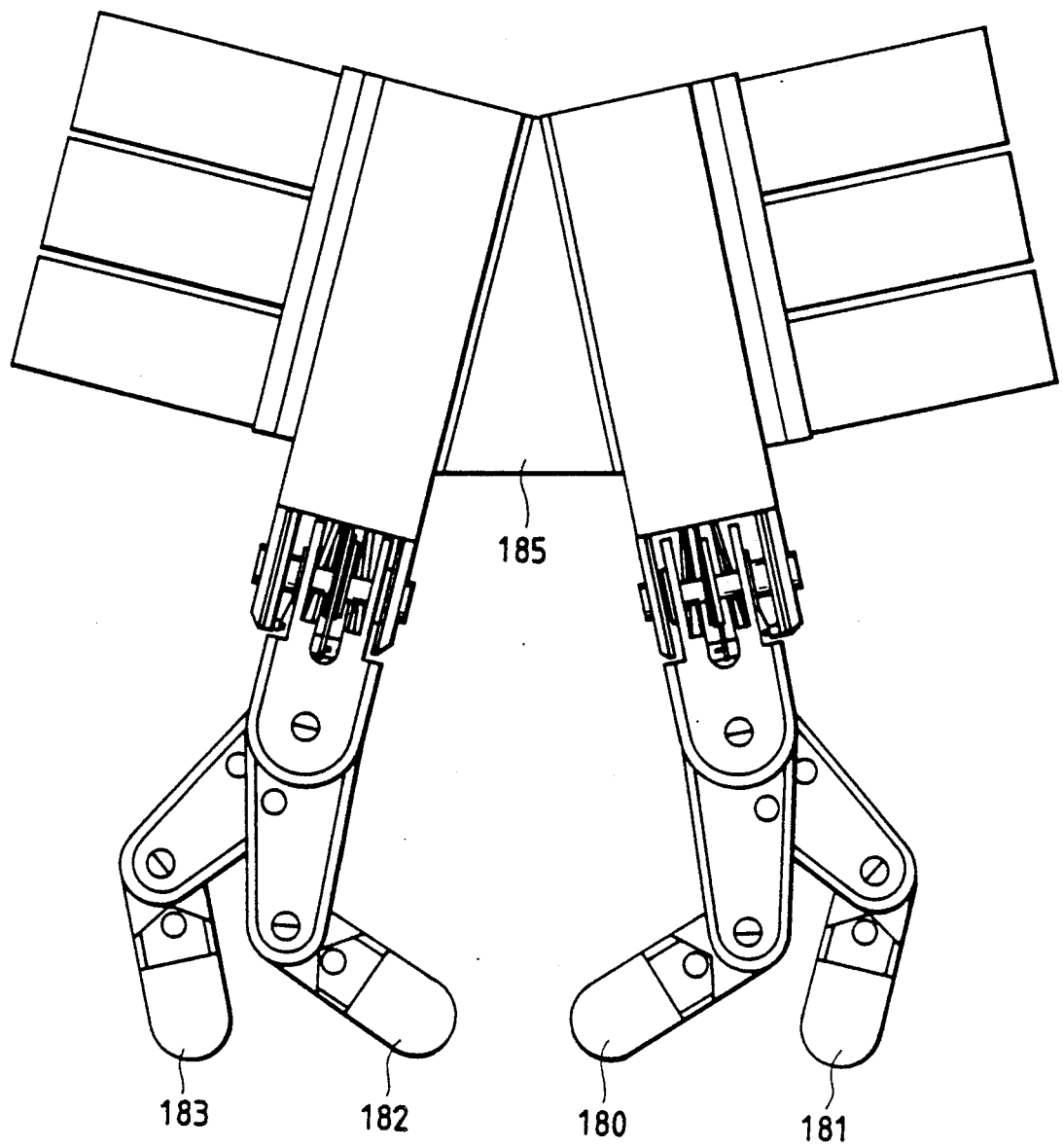

FIGS. 6 and 7 are views showing a second embodiment of the articulated hand. In the second embodiment, four modules (180, 181, 182 and 183) constructed as described above are connected by a finger connecting member 185 to form a four-finger hand in which the fingers are combined in pairs so as to be opposite to each other. The hand of the second embodiment can have a larger number of contacting points with a subject to be grasped, compared with the articulated hand of the first embodiment. There arises a large practical effect in that stable and steady grasping and handling of the grasped subject can be attained.

Further, stable grasping can be attained if at least three of the four fingers can touch the subject. There arises an effect in that it is possible to attain such higherranking work (for example, work of screwing a nut to a bolt) as the subject, while being grasped, can be shifted from one to another finger by successively changing fingers to be departed from the subject.

When objects to be grasped are light, two objects can be grasped at once respectively by fingers in pairs each being opposite to each other. There arises an effect in that working efficiency can be improved.

Because one finger is always free, the hand can be applied to such work as parts having a lock mechanism are assembled while a simple operation (for example, an unlocking operation) is carried out on the parts grasped by the hand.

Although the embodiments have shown the case where a hand is formed by combination of three or four finger modules, it is a matter of course that the present invention is not limited to the foregoing specific embodiments and that the present invention can be applied to the case where a hand may be formed by combination of a larger or a smaller number of finger modules.

THIRD EMBODIMENT

Figure 8:
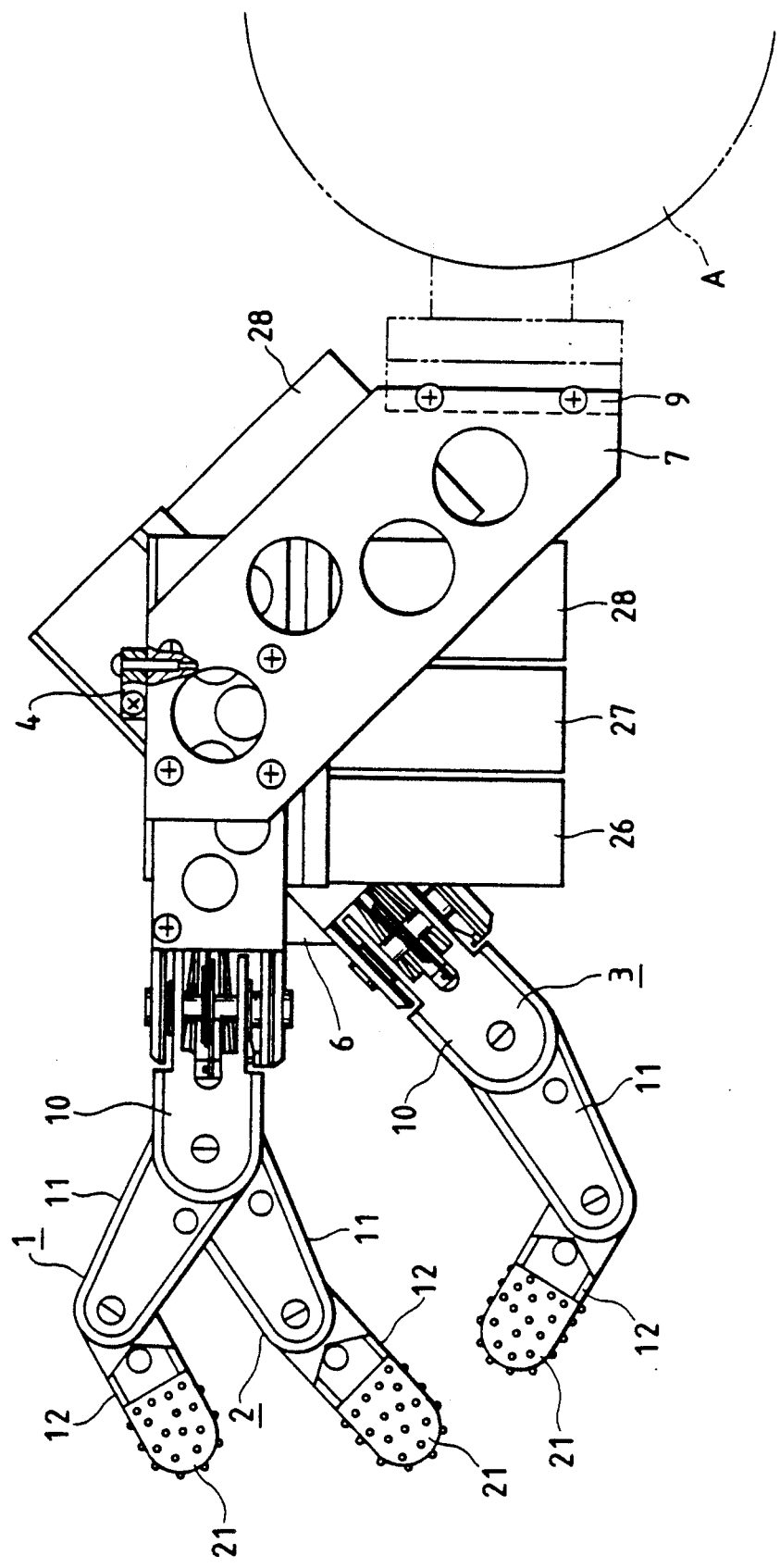
FIG. 8 is a side view of a third embodiment of the articulated hand according to the present invention.
Figure 9A:
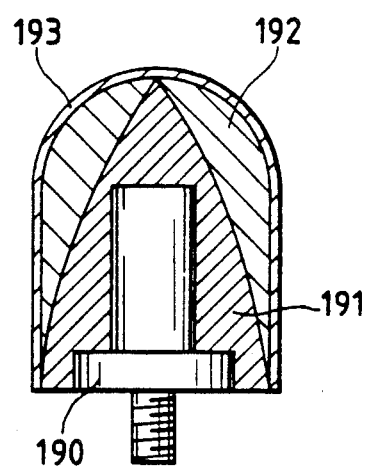
FIGS. 9(a) and 9(b) are sectional and side views of a finger tip fitted up in a finger top of the hand.
Figure 9B:
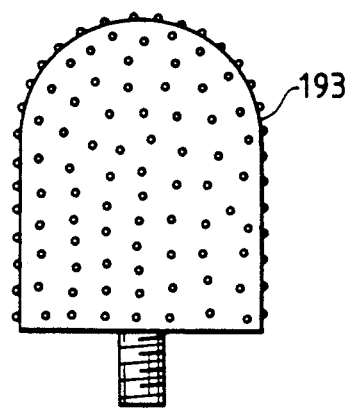

FIG. 8 is a view showing a third embodiment of the articulated hand. The third embodiment is different from the first embodiment in the structure of the finger tip 21 attached to the top of the third link 12. As shown in FIGS. 9(a) and 9(b), the finger tip 21 is composed of a rod-like core member 190 having a screw portion at its one end, a base member 191 substantially conically shaped in its external appearance and formed of hard rubber or the like, another base member 192 shaped like a human finger top in its external appearance and formed of softer material than that of the base member 1, and an elastic skin member 193 shaped like a human finger top in its external appearance and subjected to a surface treatment for patterning its outer surface with fine bosses or wrinkles to increase the coefficient of friction. The rod-like core member 190 is inserted in the center of the base member 191. The base member 192 is fixed to the outside of the base member 191 so as not to be peeled off. The skin member 193 is put on the outside of the base member 192.

The hand of the third embodiment having the finger tip 21 attached thereto can change its form in accordance with the external form of a subject when the hand grasps the subject. At the same time, an optimum surface condition can be selected. Accordingly, the hand of the third embodiment has a large practical effect in that the subject can be grasped more securely, compared with the hand of the first embodiment.

If the finger top is hard and the object and the finger top are different in the surface form, the contacting portion therebetween is formed like a point. In this third embodiment, the conical base member 191 is covered with the base member 192 formed of a softer member to thereby shape the exterior of the finger top. Accordingly, the form of the base member 192 can be changed in accordance with the surface form of the subject though the surface form of the finger may be very different than that of the subject. Accordingly, the contacting portion is shaped like a plane to thereby attain stable and steady grasping.

In the third embodiment, the form of the finger portion can be changed moderately because the core member made of metal and the conical base member 191 made of hard rubber respectively exist in the center portion and in the outside of the core member. Consequently, there is no possibility that the hand could not grasp because of its deformation.

In the third embodiment, the finger tip has a multilayer structure. Accordingly, an optimum combination can be easily selected in accordance with the form, hardness, friction coefficient and other factors of the subject. (If the finger tip is mono-layered, it will be necessary but practically difficult to find a material satisfying all the conditions).

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An articulated hand comprising:
    a plurality of finger module structures each of which has a top end provided with an abutting member for contacting an object and an other end connected to a finger connecting member and has a plurality of articulates formed between said top end and said other end by a plurality of link members rotatably mounted on articulate turn-shafts so that said articulates are capable of being bent and stretched both in a first direction vertical to the longitudinal direction of said finger module structure and in a second direction perpendicular to said first direction;
    a plurality of motors provided at said other end of each of said finger module structures integrally therewith in a manner so as to give torque to said link members through power transmitting means to thereby freely bend and stretch said link members independently of each other; and
    a hand structure connected to a manipulator so as to arrange at least one of said finger module structures in opposition to at least one other of said finger module structures and so as to change a distance between said finger module structures in opposition to each other through the operation of said motors to bring said finger structures into contact with said object; wherein
    said finger module structures are arranged in a manner so that said articulate turn-shafts are driven independently of each other,
    each of said link members is provided with sensors respectively for directly detecting a relative angle and a relative torque between adjacent link members, and
    independent angle-torque servo systems are provided for each of said articulate turn-shafts for comparing said relative angle and torque directly detected by said angle and torque sensors with a desired value thereof and processing resultant deviation signals therebetween; and
    wherein each of said motors is connected to a variable constant-current source to change its power through changing an instruction current value and wherein values of motor revolution speed obtained from driving voltages of said motors are respectively fed back to servo systems to thereby correct said instruction current values so that damping may be applied to said angle-torque servo systems.

2. An articulated hand comprising:

a plurality of finger module structures each of which has a top end provided with an abutting member for contacting an object and an other end connected to a finger connecting member and has a plurality of articulates formed between said top end and said other end by a plurality of link members rotatably mounted on articulate turn-shafts so that said articulates are capable of being bent and stretched both in a first direction vertical to the longitudinal direction of said finger module structure and in a second direction perpendicular to said first direction;

a plurality of motors provided at said other end of each of said finger module structures integrally therewith in a manner so as to give torque to said link members through power transmitting means to thereby freely bend and stretch said link members independently of each other; and a hand structure connected to a manipulator so as to arrange at least one of said finger module structures in opposition to at least one other of said finger module structures and so as to change a distance between said finger module structures in opposition to each other through the operation of said motors to bring said finger structures into contact with said object; wherein said finger module structures are arranged in a manner so that said articulate turn-shafts are driven independently of each other, each of said link members is provided with sensors respectively for directly detecting a relative angle and a relative torque between adjacent link members, and independent angle-torque servo systems are provided for each of said articulate turn-shafts for comparing said relative angle and torque directly detected by said angle and torque sensors with a desired value thereof and processing resultant deviation signals therebetween; and wherein each of said angle-torque servo systems comprises means for calculating motor revolution speed (Nm) on the basis of a difference between motor voltage (Vg) and a product of rotor resistance (Rm) of the motor output current (Im) of the variable constant-current source.

3. An apparatus according to claim 1, wherein said at least one of said finger module structures has three of said articulate turn-shafts such that the position of the finger top and a force produced in the finger top can be designed freely in three dimensions.

4. An articulated hand comprising:

a plurality of finger module structures each of which has a top end provided with an abutting member for contacting an object and an other end connected to a finger connecting member and has a plurality of articulates formed between said top end and said other end by a plurality of link members rotatably mounted on articulate turn-shafts so that said articulates are capable of being bent and stretched both in a first direction vertical to the longitudinal direction of said finger module structure and in a second direction perpendicular to said first direction;

a plurality of motors provided at said other end of each of said finger module structures integrally therewith in a manner so as to give torque to said link members through power transmitting means to thereby freely bend and stretch said link members independently of each other; and a hand structure connected to a manipulator so as to arrange at least one of said finger module structures in opposition to at least one other of said finger module structures and so as to change a distance between said finger module structures in opposition to each other through the operation of said motors to bring said finger structures into contact with said object; wherein said finger module structures are arranged in a manner so that said articulate turn-shafts are driven independently of each other, each of said link members is provided with sensors respectively for directly detecting a relative angle and a relative torque between adjacent link members, and independent angle-torque servo systems are provided for each of said articulate turn-shafts for comparing said relative angle and torque directly detected by said angle and torque sensors with a desired value thereof and processing resultant deviation signals therebetween; and wherein said abutting member is provided at said top end of said finger structure and is composed of a rod-like core member having a screw portion at one end, a base member substantially conically shaped in its external appearance and formed of softer material than that of the rod-like core member, an other base member shaped like a human finger top in its external appearance and formed of softer material than that of said base member, and an elastic skin member shaped like a human finger top in its external appearance and subjected to a surface treatment for patterning its outer surface with fine bosses or wrinkles to increase the coefficient of friction of said skin member, said rod-like core member being inserted in a center of said conically shaped base member, said skin member being fixed to an exterior surface of said other base member so as not to be peeled off.

5. An articulated hand comprising at least one finger module structure and a finger connecting member in which said one finger module structure comprises:

a plurality of articulate portions having link members for forming the finger structure and articulate turn-shafts for rotatably connecting said link members;

power transmitting means for freely bending and stretching said link members independently; and drive means connected to a variable constant-current source so as to change power to said drive means by changing an instruction current value;

sensor means for directly detecting an interlink angle between adjacent link members and for directly detecting relative torque between adjacent link members; and an independent angle-torque servo system provided for each of said articulate turn-shafts in order to move said articulate turn-shafts independently of one another based on the interlink angle and torque detected by said sensor means;

and wherein values of driving revolution speed obtained from driving voltages of said drive means are respectively fed back to said servo systems to thereby correct said instruction current values so that damping may be applied to said angle-torque servo systems.

6. An articulated hand according to claim 5, in which said finger module structure has one top end provided with an abutting member for contacting a subject and an other end connected to said finger connecting member wherein said articulate portions are formed between said one and said other ends by said link member and said articulate turn-shafts so that said articulates are capable of being bent and stretched both in a first direction vertical to the longitudinal direction of said finger structure and in a second direction perpendicular to said first direction.

7. An articulated hand according to claim 6, wherein said drive means is provided at said other end of each of said finger module structures in a manner so as to provide torque to said link members through said power transmitting means to thereby freely bend and stretch said link members independently of each other.

8. An articulated hand according to claim 7, wherein said abutting member is composed of a rod-like core member having a screw portion at its one end, a base member substantially conically shaped in its external appearance and formed of softer material than that of the rod-like core member, another base member shaped like a human finger top in its external appearance and formed of softer material than that of said base member, and an elastic skin member shaped like a human finger top in its external appearance and subjected to a surface treatment for patterning its outer surface with fine bosses or wrinkles to increase the coefficient of friction of said skin member, said rod-like core member being inserted in a center of said conically shaped base member, said skin member being fixed to an exterior surface of said base member so as not to be peeled off, wherein said articulated hand is connected to a manipulator.

9. An articulated hand having a plurality of individually actuatable finger modules for grasping an object, wherein:
  each of said finger modules is interchangeable with every other finger module of said articulated hand;
  each of said finger modules includes a plurality of link members pivoted to one another;
  each link member of a given finger module is operated by a separate electric motor provided on said given finger module;
  each link member of said given finger module includes sensor means for directly detecting a relative angle between adjacent link members and for directly detecting a relative torque between adjacent link members;
  each link member of said given finger module is independently controlled by a control means located on said given finger module, said control means controlling a voltage to said electric motor;
  said control means includes a means for processing said relative angle and said relative torque; and wherein
  said independent control means further includes a compensator responsive to said means for processing, said compensator producing a signal which effects the control of said voltage.

* * * * *